Patented Sept. 19, 1939

2,173,731

UNITED STATES PATENT OFFICE 2,173,731

VULCANIZATION OF RUBBER

Winfield Scott, Akron, Ohio, assignor to Wingfoot Corporation, Wilmington, Del., a corporation of Delaware No Drawing. Application April 2, 1936, Serial No. 72,331

13 Claims. (Cl. 18—53)

This invention relates to the vulcanization of rubber and, more particularly, to a new class of accelerators of vulcanization. The new class of accelerators of the invention are mercapto aryl thiazole derivatives and may be called methylol guanidine reaction products of mercapto aryl thiazoles.

Heretofore various mercapto aryl thiazole derivatives have been used as accelerators of vulcanization. The reaction product of diphenylguanidine and mercaptobenzothiazole is one such derivative. It is a very active accelerator but has the disadvantage of having a low critical temperature or, in other words, it is, as commonly called in the art, scorchy. U. S. Patent 1,656,891 discloses mercapto aryl thiazole derivatives which are prepared by reacting an aldehyde with the reaction product of a mercapto aryl thiazole and an organic base. One specific example disclosed in the patent is the resinous material obtained by reacting crotonaldehyde with the diortho tolyl guanidine salt of 1-mercaptobenzothiazole.

This invention resides in the discovery that by first reacting formaldehyde and a guanidine to form what is believed to be the methylol derivative of the guanidine and then reacting this product with a 1-mercapto aryl thiazole, there are obtained hard, resinous products which are excellent accelerators.

To prepare these products of the invention, it is necessary to react the three materials in the order stated—at least to obtain the products in efficient yields. Thus, if one mixes simultaneously mercaptobenzothiazole, a guanidine and formaldehyde, the latter material preferably being in aqueous solution or as para formaldehyde, large amounts of the guanidine salt of the mercapto aryl thiazole are obtained. This material is, as previously stated, very scorchy. Similar results are obtained when methylol mercaptobenzothiazole or, as it is more properly called, benzothiazyl methylene hydrin, is reacted with a guanidine such as diphenylguanidine. Formaldehyde is lost and the diphenylguanidine salt of mercaptobenzothiazole is the principal product.

Of the mercapto aryl thiazoles, it will be understood that those of the benzene and naphthalene series, and particularly those of the benzene series, are preferred. Illustrative are 1-mercaptobenzothiazole, 1-mercapto 3-phenyl thiazole, 1-mercapto 3- or 5-methyl benzothiazole, 1-mercapto 5-nitro benzothiazole, 1-mercapto 3- or 5-ethoxy benzothiazole, 1-mercapto 3- or 5-methoxy benzothiazole, 1-mercapto 5-chlor benzothiazole, 1-mercapto 4-nitro 5-chlor benzothiazole, 1-mercapto 3-phenyl benzothiazole, 1-mercapto 3-hydroxy benzothiazole, the 1-mercapto xylyl thiazoles, the 1-mercapto naphthothiazoles, and other alkyl-, aryl-, aralkyl-, halo-, nitro-, and hydroxy substituted arylene mercaptothiazoles. It will be understood that by the expression "mercapto arylene thiazoles of the benzene and naphthalene series", it is intended to include non-hydrocarbon substituents in the benzene and naphthalene ring, illustrative of which are those previously described. Where "arylene" is intended to connote only hydrocarbons, the expression "hydrocarbon arylene" will be used.

Any guanidine may be employed in the practice of the invention, although the aryl substituted guanidines and, in particular, the diaryl guanidines are preferred. Illustrative are diphenylguanidine, triphenylguanidine, tri ortho tolyl guanidine mono phenyl guanidine, diortho anisyl guanidine, di para phenetidyl guanidine, the amino-, di-, and tri-xylyl guanidines, di (p-hydroxy phenyl) guanidine, mono ortho guanidine, phenyl naphthyl guanidine, dinaphthyl guanidine, and other aryl substituted guanidines. Still others are guanidine, dibenzyl guanidine, benzyl phenyl guanidine, dimethyl guanidine, butyl guanidine, benzyl guanidine, tribenzyl guanidine, tri methyl guanidine, and other alkyl and aralkyl substituted guanidines, and the biguanidines such as the mono-, di- and tri-substituted biguanidines.

Illustrative of the preparation of the products of the invention is the reaction product of methylol diphenyl guanidine and mercaptobenzothiazole. It is prepared by warming a mixture of 42.2 grams of diphenylguanidine and 6.0 grams of para formaldehyde. At a temperature of 80–85° C, the mixture is a liquid. The temperature is then raised to 100° C. and maintained at this point for a period of 10–15 minutes, no evidence of the elimination of water being observed. This material, on cooling, will form a clear brittle resin. This reaction product is believed to be methylol diphenylguanidine and to it, at a temperature of 100° C., are added 33.4 grams of 1-mercaptobenzothiazole. Heating is continued, considerable frothing being observed as the temperature is slowly raised. This frothing is believed to be caused by the liberation of water which is eliminated by the condensation. When a temperature of 140–145° C. is reached, it is held constant until no more water forms. This requires a period of approximately 20–30 minutes. The mass is then allowed to cool, the final product being obtained in the form of a light yellow brittle resin which is easily ground. It can, however, be incorporated into rubber without grinding as it readily disperses into a mix. This preferred accelerator was found to contain none of the diphenylguanidine salt of mercaptobenzothiazole.

Other accelerators of the invention which have been prepared are the reaction products of the methylol derivative of diphenylguanidine with 1-mercapto 5-methyl benzothiazole and with 1-mercapto 5-ethoxy benzothiazole, the reaction product of the methylol derivative of diortho tolyl guanidine with 1-mercapto-benzothiazole, the corresponding products in which the diortho tolyl guanidine was substituted respectively by dipara guanidine, tri para tolyl guanidine and di tolyl guanidine, tri para tolyl guanidine and di cyan diamide, which may also be called cyano guanidine. All of these products are clear yellow resins which are easily incorporated into rubber. Other members of the invention may be prepared similarly by substituting various other guanidines and mercapto aryl thiazoles for those given in the illustrative examples.

The accelerators of the invention may be employed in practically any of the ordinary rubber formulae, they being particularly valuable in those rubber stocks which require an active accelerator having a fairly high critical temperature. An illustrative formula in which they have been found valuable is as follows:

Smoked sheet rubber_____parts by weight__ 100
Zinc oxide _____ do -- 5
Sulphur_____ do -- 3
Accelerator_____as indicated Various illustrative accelerators of the invention were incorporated in varying amounts in separate portions of a rubber stock corresponding to the preceding formula and vulcanized in a press for varying periods of time. In the following table tensile and elongation figures are given for the best or optimum cure for several illustrative accelerators. The results are as follows:

| Accelerator | Amt. pts. by wt. | Cure in mins. at temp. °F. | Modulus kgs/cm.² 500% | Modulus kgs/cm.² 700% | Max. tens | Ult. elg. percent |
|---|---|---|---|---|---|---|
| 1 | .30 | 60/260 | 30 | 119 | 142 | 725 |
| 2 | .35 | 40/260 | 29 | 97 | 108 | 720 |
| 3 | .35 | 40/260 | 24 | 75 | 96 | 740 |
| 4 | .30 | 30/260 | 26 | 99 | 138 | 750 |
| 5 | .30 | 60/230 | 20 | 78 | 143 | 810 |
| 6 | .35 | 40/260 | 20 | 60 | 128 | 840 |
| 7 | .50 | 80/260 | 23 | 74 | 116 | 770 |

The various accelerators employed in the stocks for which the above data is presented are identified as reaction products of the following methylol guanidines and mercapto aryl thiazoles:

| | Methylol derivative of | Mercapto aryl thiazole |
|---|---|---|
| 1 | Diphenyl guanidine | 1-mercaptobenzothiazole. |
| 2 | do | 1-mercapto 5-methyl benzothiazole. |
| 3 | do | 1-mercapto 5-ethoxy benzothiazole. |
| 4 | Di-o-tolyl guanidine | 1-mercaptobenzothiazole. |
| 5 | Di-p-tolyl guanidine | Do. |
| 6 | Tri-p-tolyl guanidine | Do. |
| 7 | Dicyandiamide | Do. |

From the above test results, it is apparent that active accelerators even at curing temperatures of 260° F. are provided. The accelerators of the invention further have the advantages of being stable at temperatures ordinarily used in storage and of being readily incorporable in rubber.

It will be understood that the examples previously decribed are but illustrative and not limitative of the invention. The exact composition of the products is not known although it appears that in most cases the reactants react in molecular proportions. The times and temperatures employed in preparing the products also may be varied within wide limits, it being essential merely to react the guanidine and the formaldehyde and, thereafter, to condense this product with a mercapto aryl thiazole. It is intended to cover, by suitable expression in the appended claims, all features of patentable novelty inherent in the invention.

What I claim is:

1. The process of accelerating the vulcanization of rubber which comprises vulcanizing in the presence of the thiazole derivative accelerator obtainable by reacting, under conditions involving the elimination of water, approximately equimolar proportions of mercaptobenzothiazole and the equimolar addition product of formaldehyde and diphenylguanidine.

2. The process of accelerating the vulcanization of rubber which comprises vulcanizing in the presence of the thiazole derivative accelerator obtainable by reacting, under conditions involving the elimination of water, approximately equimolar proportions of mercaptobenzothiazole and the equimolar addition product of formaldehyde and a diphenylguanidine.

3. The process of accelerating the vulcanization of rubber which comprises vulcanizing in the presence of the thiazole derivative accelerator obtainable by reacting, under conditions involving the elimination of water, approximately equimolar proportions of mercaptobenzothiazole and the equimolar addition product of formaldehyde and an aryl substituted guanidine.

4. The process of accelerating the vulcanization of rubber which comprises vulcanizing in the presence of the thiazole derivative accelerator obtainable by reacting, under conditions involving the elimination of water, approximately equimolar proportions of mercaptobenzothiazole and the equimolar addition product of formaldehyde and a guanidine.

5. A rubber vulcanization accelerator composition comprising a thiazole derivative obtainable by reacting, under conditions involving the elimination of water, approximately equimolar proportions of a mercapto aryl thiazole and an equimolar addition product of formaldehyde and a diphenylguanidine.

6. The process of accelerating the vulcanization of rubber which comprises vulcanizing in the presence of a thiazole derivative accelerator obtainable by reacting, under conditions involving the elimination of water, in substantially equimolar proportions a mercaptobenzothiazole and an equimolar addition product of formaldehyde and an aryl substituted guanidine.

7. The process of accelerating the vulcanization of rubber which comprises vulcanizing in the presence of the thiazole derivative accelerator obtainable by reacting, under conditions involving the elimination of water, approximately equimolar proportions of mercaptobenzothiazole and the equimolar addition product of formaldehyde and diortho tolyl guanidine.

8. The vulcanizates obtainable according to the process of claim 1.

9. The vulcanizates obtainable according to the process of claim 4.

10. The vulcanizates obtainable according to the process of claim 6.

11. The thiazole derivatives obtainable by reacting, under conditions involving the elimination of water, approximately equimolar proportions of mercaptobenzothiazole and the equimolar addition product of formaldehyde and diphenylguanidine.

12. The thiazole derivatives obtainable by reacting, under conditions involving the elimination of water, approximately equimolar proportions of mercaptobenzothiazole and an equimolar addition product of formaldehyde and a diphenylguanidine.

13. A process of accelerating the vulcanization of rubber which comprises vulcanizing in the presence of a thiazole derivative accelerator which is the equimolecular reaction product, formed under conditions involving the elimination of water, of a mercapto aryl thiazole and an equimolecular addition product of formaldehyde and a guanidine.

WINFIELD SCOTT.